April 14, 1931. J. W. LEWIN 1,800,839
CONDUIT COUPLING
Filed April 1, 1929
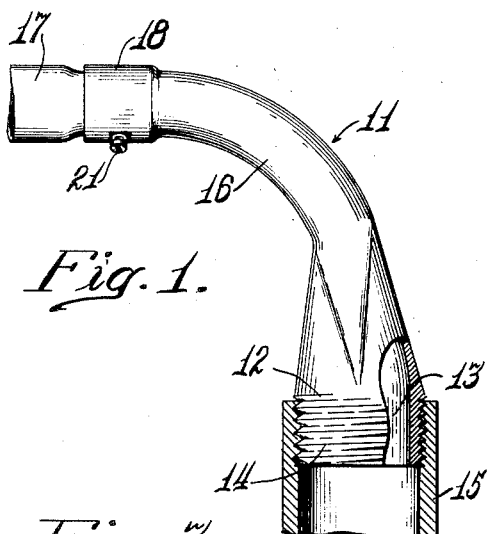
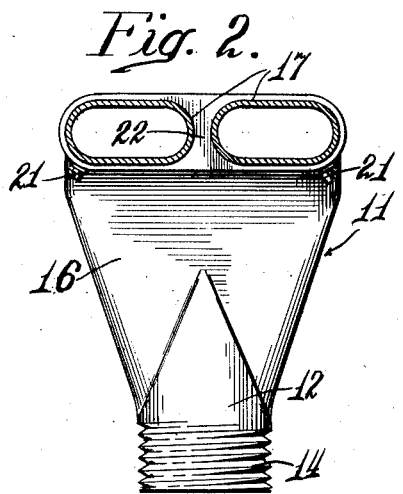
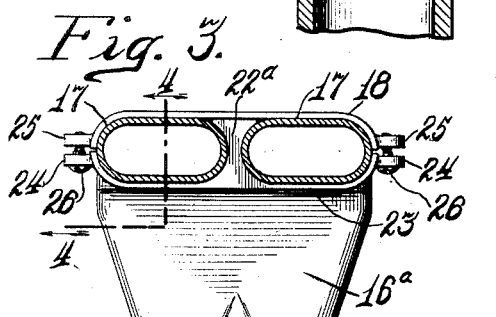
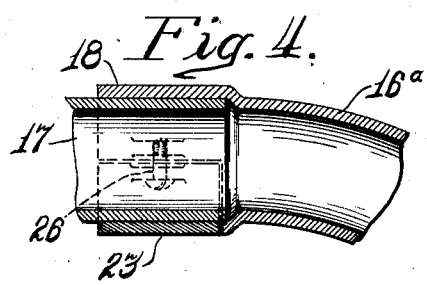
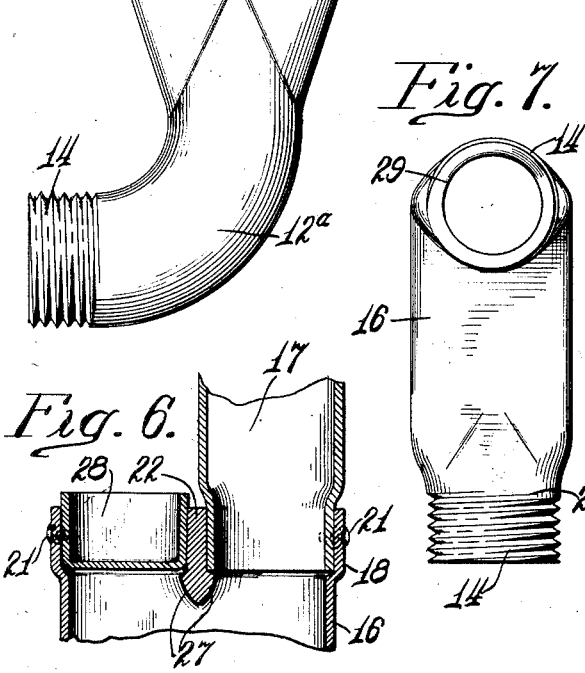
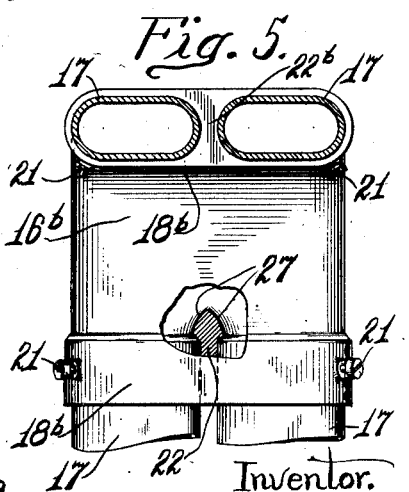
Inventor.
Jacob W. Lewin
Daniel Brennan
Attorney.

Patented Apr. 14, 1931

1,800,839

UNITED STATES PATENT OFFICE

JACOB W. LEWIN, OF OAK PARK, ILLINOIS.

CONDUIT COUPLING

Application filed April 1, 1929. Serial No. 351,553.

The invention relates to improvements in conduit couplings and particularly to a novel adapter for oval ducts for use where it is necessary to feed electric wires around corners in the walls of a building.

The improved adapter for oval ducts set forth in the following specification is particularly adapted for use in concrete columns, floors, walls, and so forth, at points where it has heretofore been necessary to employ outlet boxes.

The adaptation of the improved adapter for oval duct in the place of outlet boxes effects a material saving in the cost of installing conduits by eliminating outlet boxes, cover plates, lock nuts and bushings. The use of outlet boxes having detachable cover plates has also been objectionable particularly when employed in buildings of concrete construction. Before setting, the cement often seeps into these boxes and thence into the conduits connected therewith, thus interfering with the feeding of electric wires therethrough.

It is, therefore, an object of the present invention to provide an oval duct adapter having such novel features of construction that overcome the aforementioned objections.

Another object of the present invention is to provide an adapter for oval ducts having means for accommodating a plurality of conduits and ducts where more than one is necessary.

Another object is to provide an adapter for accommodating a plurality of oval ducts having comparatively few parts, thereby reducing the cost of manufacture and the time required to install same in a wiring system.

Another object of the invention resides in the provision of a curved adapter for a plurality of oval ducts having an arc whose radius is such that said adapter will require a minimum amount of space without offering resistance to the feeding of electric wires therethrough.

Another object is to provide a novel adapter for oval ducts having means therein for receiving said ducts in a tight association, thereby preventing cement, plaster, or the like, from entering the passageways therein and interfering with the feeding of electric wires therethrough.

The invention, in general, comprises a curved conduit coupling or adapter for oval ducts having a comparatively smooth interior surface, gradually arched to facilitate the feeding of electric wires through the same. The conduit coupling is provided with attaching means integral therewith for making the same adaptable to be readily connected with conduit pipes without requiring the use of additional or special couplings or fittings.

The improved conduit coupling preferably is formed of one piece, however, securing means for the oval duct may be detachable but said detachable portion preferably is mounted in place at the time of manufacture to permit ready and quick installation of the self contained unit. The novel method of constructing the present curved conduit coupling or adapter simplifies its manufacture and installation.

These and such other objects, as will appear hereinafter as the description proceeds will be more readily understood from a perusal of the following specification, reference being had to the accompanying drawing, in which exemplary forms are illustrated:

Fig. 1 is a side elevational view of the improved curved adapter for oval ducts showing an oval duct secured in one end thereof.

Fig. 2 is an end elevational view of the oval duct adapter shown in Fig. 1, the oval duct therein being shown in section.

Fig. 3 is a view similar to Fig. 2, but showing a slightly modified form of adapter.

Fig. 4 is a vertical sectional view taken on line 4—4 of Fig. 3 showing the shoulder provided within the novel adapter.

Fig. 5 is an end elevational view showing another modified form of the adapter, applicable in installation requiring parallel conduits.

Fig. 6 is a vertical central sectional view through a portion of the improved oval duct adapter having a plug in one of the oval duct outlets therein.

Fig. 7 is a similar view of another modified form of the invention, showing the novel adapter having means for receiving conduit pipe on each end thereof.

The novel adapter, as shown in the various figures of the drawing preferably consists of a body portion having means on one end adapted to have threaded engagement with a conduit pipe. The opposite end of the body portion is provided with an extension 16 angularly disposed to said body portion and having means on its end for receiving and clamping therein one or more oval shaped conduits or ducts.

Referring, in detail, to the form of the invention shown in Figs. 1 and 2, the oval duct adapter or coupling 11 is provided with a relatively short body portion 12 which is formed with a central opening or passage 13 and which preferably is cylindrical in shape. One end of this body portion is threaded externally, as at 14, to permit a conduit pipe 15 to be screwed thereover.

The opposite end of the body portion 12 terminates in an extension 16, said extension being curved on a relatively small radius so as to reduce the general overall size of the coupling. The extension 16 is substantially flattened in cross section to provide an elongated oval passageway in continuation of the central opening 13 in the body 12.

This particular type of coupler is adapted to be used when employing one conduit pipe for housing two independent lines, said lines extending parallel outwardly from the end of the extension 16, thereby eliminating the necessity of providing two separate conduits and separate couplings therefor, both running in the same direction as has commonly been the practice previous to this invention.

The employment of this novel adapter for branching two conduits from a single line also eliminates the necessity of employing an outlet box at the juncture thereof. The use of these outlet boxes is expensive both in material and installation cost as they necessitate the use of cover plates and lock nuts or bushings. Outlet boxes used in this manner require considerable space and this novel adapter having the substantially flattened extension 16 permits closer adaptation of the conduit and ducts to the wall.

The free end of the extension 16 is adapted to be connected with suitable oval-shaped ducts 17 for housing the branching lines. To provide for this the free end of the extension 16 is struck outwardly to form offset portions 18 which receive the end of said ducts. As will be noted, from reference to Fig. 4, a smooth passageway is provided at the connection so that the lines may be easily threaded therethrough.

Suitable means is provided for clamping the duct 17 in the free end of the extension. In the present instance, each offset portion 18 is provided with an angularly disposed set screw 21 which, when tightened, bears against and retains the oval duct within said offset. The offset portion 18, of the extension 16 is provided with a centrally located partition 22 to provide independent openings for each section of oval duct, thereby affording complete closure of the coupler unit when the oval duct 17 is in place.

In the modified form of the invention, shown in Figs. 3 and 4, the adapter is novelly shaped to permit a rise to be made in the lines when said lines extend in the same plane as the conduit but at right angles thereto. This is attained by providing the curved body portion 12a which may be curved in the direction shown or in any other suitable direction. In this form of the invention a novel method of securing the oval duct 17 within the offset portion 18 is provided. This is provided for by cutting away a portion of the under side of the offset end 18, as shown. A detachable clamping member or bracket 23, is placed in this cut-out portion, said bracket having apertured ears 24 on its ends adapted to align with ears 25 on the offset portion. Screws 26 extending through the apertured ears 24 are threaded into tapped openings in ears 25 to securely clamp the oval duct 17 therein.

As will be noted, particularly in Fig. 3, the centrally located partition 22a preferably is formed integral with the clamping member 23 to permit its ready removal to facilitate fishing of the wires through the adapter before either or both ducts 17 are in place. If desired, this centrally located partition may be made separate of the clamping member 23, it being held in place by suitable screws or the like (not shown). The ends of ducts 17 extend into the offset as before, they abutting the shoulder formed by said offset in the body, thus the seam at the joining of the clamp 23 and the edge of the cut-out is sealed.

The adapter shown in Fig. 5 is provided with offsets 18b on each end for receiving oval duct. If desired the offset 18b may be cut away, as in Figs. 3 and 4, and the clamp 23 substituted for set screws 21 to retain the duct in position. In this figure a portion of the coupler has been broken away to show the formation of the end of the partition 22. It will be noted that this partition is rounded on its inner edge, as at 27, to afford little or no resistance to the lines being drawn thru the adapter. In the event that only one oval duct is to extend from the novel adapter, a plug 28, such as shown in Fig. 6, may be employed to close the unused duct opening, said plug being securely retained therein by the set screw 21.

The form of the invention shown in Fig. 7 shows a substantially flat curved adapter having a rounded body portion 29 on each end thereof having external threads thereon to receive conduit piping. An adapter of this character requires less space than that required by an outlet box which is now necessarily employed for making connections when conduit pipe is employed, and is especially adapted at bends where it is impractical or inconvenient to bend said pipe.

It will readily be understood that when using an adapter having the aforementioned characteristics to provide a conduit for electric wires, there are no obstacles present in the interior thereof to interfere with the free passage of the electric wires therethrough. Joining of the oval duct 17 and the conduit pipe 15 with the adapter 11 is afforded without leaving apertures to permit cement, plaster, or the like, to find its way therein. The curvature of the extension 16 is such that the electric wires can easily and naturally move around the bend while being fed through the conduit and said wires can readily find their way into the proper duct by the provision of the rounded end 27 on the central partition 22.

Although exemplary forms of the invention have been illustrated and described, it is to be understood that they are capable of variations and modifications without departing from the spirit of the invention. I, therefore, desire to avail myself of such variations and modifications as fall within the scope of the appended claims.

I claim:

1. An adaptor for oval ducts comprising a cylindrical body portion having external threads on one end, an extension on the other end, said extension being curved and having means on the outer end thereof for receiving a plurality of oval ducts therein.

2. An adaptor for oval ducts comprising a cylindrical body portion having external threads on one end, and a curved extension on the other end, said extension having a plurality of openings in the end thereof to receive oval ducts.

3. An adaptor for oval ducts comprising a cylindrical body portion having threads on one end, the other end of said body being flattened to provide an oval-shaped extension, said extension being curved and having openings in the end thereof to receive oval ducts.

4. An adaptor for oval ducts comprising a cylindrical body portion having external threads on one end, the other end of said body being formed substantially flat in cross section to provide an extension, said extension being curved and having a plurality of oval shaped apertures in the free end thereof.

5. An adaptor for oval ducts comprising a cylindrical body portion having threads on one end, the other end of said body portion having its oppositely disposed side walls flared inwardly and outwardly respectively to provide a substantially flat hollow extension, said extension being curved.

6. An adaptor for oval ducts comprising a cylindrical body portion having threads on one end, the other end of said body portion having its oppositely disposed side walls flared inwardly and outwardly respectively to provide a substantially flat hollow extension of greater cross sectional area than said body portion, said extension being curved.

7. An adaptor for oval ducts comprising a cylindrical body portion having external threads on one end, the other end of said body having its oppositely disposed side walls flared inwardly and outwardly respectively to provide a substantially flat hollow extension, said extension being curved and an offset portion on its outer end.

8. An adaptor for oval ducts comprising a cylindrical body portion having threads on one end, a curved extension on the other end of said body portion, said curved extension being substantially oval in cross section and having an offset portion on its end for receiving a plurality of oval ducts therein.

9. An adaptor for oval ducts comprising a cylindrical body portion having threads on one end, a hollow curved extension on the other end of said body portion, said extension being substantially oval in cross section and having an offset portion on its outer free end, said offset portion forming a shoulder to provide an abutment for oval ducts secured therein.

10. An adaptor for oval ducts comprising a cylindrical body portion having external threads on one end, a hollow curved extension on the other end of said body portion, said extension being substantially oval in cross section, an offset portion on the outer end of said extension, said offset portion forming a shoulder to provide an abutment for oval ducts, and means associated with said offset portion for securing the oval duct therein.

11. An adaptor for oval ducts comprising, a cylindrical body portion having threads on one end; the other end of said body portion being curved and having its oppositely disposed side walls flared inwardly and outwardly respectively to provide a substantially oval-shaped extension; and two-part clamping means formed on the end of said extension for securing a plurality of oval-shaped ducts therein.

12. An adaptor for oval ducts comprising, a cylindrical body portion having one end threaded; a hollow curved extension on the other end of said body portion, said extension being substantially oval-shaped in cross section and having a cross sectional area greater than said body portion; an offset portion on the free end of said extension forming a shoulder to provide an abutment for a plurality of oval ducts, and the offset being cut away in part to receive a detachable clamping portion whereby the oval ducts are fixedly secured in place.

13. An adaptor for oval ducts comprising, a cylindrical body portion having its end threaded; a hollow curved extension on the other end of said body portion, said extension being substantially oval-shaped in cross section and having a cross sectional area greater than said body portion; an offset portion on the free end of said extension having a shoulder to provide an abutment for a plurality of oval ducts, said offset being cut away in part; and a detachable clamping member adapted to co-operate with said offset portion for securing the oval ducts in place.

14. An adaptor for oval ducts comprising, a cylindrical body portion having one end threaded; a hollow curved extension on the other end of said body portion, said extension being substantially oval-shaped in cross section and having a cross sectional area greater than the body portion; an offset portion on the free end of said extension forming a shoulder to provide an abutment for a plurality of oval ducts; and a portion of said offset portion being cut away to receive a detachable clamping member, whereby the oval ducts are secured in place.

15. An adaptor for oval ducts comprising, a cylindrical body portion having one end threaded; a hollow curved extension on the other end of said body portion, said extension being substantially oval-shaped in cross section and having a cross sectional area greater than the body portion; an offset on the free end of said extension forming a shoulder to provide an abutment for a plurality of oval ducts, and said offset co-operating with a separable member to provide means for securing said ducts in place.

16. An adaptor for oval ducts comprising, a cylindrical body portion having one end threaded; a hollow curved extension on the other end of said body portion, said extension being substantially oval shaped in cross section and having a cross sectional area greater than said body portion; an offset portion on the free end of said extension forming a shoulder to provide an abutment for a plurality of oval ducts, the offset being cut away in part to receive a detachable clamping portion whereby said oval ducts are fixedly secured in place; and means carried by said clamping portion for closing the portion of the opening not occupied by said ducts.

17. An adaptor for oval ducts comprising, a cylindrical body portion having threads on one end; the other end of said body portion being curved and having its oppositely disposed side walls flared inwardly and outwardly respectively to provide a substantially oval-shaped extension; a two-part clamp formed on the end of said extension for securing a plurality of oval-shaped ducts therein; one of said parts being formed integral with said extension and the other being detachable therefrom; and a partition on said detachable part for retaining said ducts in spaced relation to each other and close the opening therebetween.

In testimony whereof I affix my signature at 10 South La Salle Street, Chicago, Illinois.

JACOB W. LEWIN.